(12) United States Patent
Saito

(10) Patent No.: US 8,381,035 B2
(45) Date of Patent: Feb. 19, 2013

(54) INFORMATION PROCESSING DEVICE FOR CREATING AND ANALYZING LOG FILES

(75) Inventor: Ken Saito, Tokoname (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 198 days.

(21) Appl. No.: 12/727,834

(22) Filed: Mar. 19, 2010

(65) Prior Publication Data

US 2011/0029818 A1    Feb. 3, 2011

(30) Foreign Application Priority Data

Jul. 31, 2009   (JP) ................................. 2009-178938

(51) Int. Cl.
    *G06F 11/00* (2006.01)
(52) U.S. Cl. ................................. 714/37; 714/2; 714/19
(58) Field of Classification Search ...................... 714/37
     See application file for complete search history.

(56) References Cited

U.S. PATENT DOCUMENTS

| | | | |
|---|---|---|---|
| 5,335,343 A * | 8/1994 | Lampson et al. ............... 714/19 |
| 5,481,694 A * | 1/1996 | Chao et al. ..................... 711/112 |
| 5,533,193 A * | 7/1996 | Roscoe ............................ 714/39 |
| 6,658,374 B2 * | 12/2003 | Fujita et al. .................... 702/188 |
| 7,882,393 B2 * | 2/2011 | Grimes et al. ................... 714/25 |
| 2004/0215998 A1 * | 10/2004 | Buxton et al. ..................... 714/2 |
| 2006/0048004 A1 * | 3/2006 | Kawashima .................... 714/23 |
| 2008/0109448 A1 * | 5/2008 | Aboel-Nil et al. .............. 707/10 |
| 2008/0244331 A1 * | 10/2008 | Grimes et al. .................. 714/48 |
| 2009/0063900 A1 * | 3/2009 | Yoshida .......................... 714/20 |
| 2010/0161863 A1 * | 6/2010 | Cota-Robles et al. ......... 710/220 |
| 2010/0262857 A1 * | 10/2010 | Enarson et al. ................... 714/2 |

FOREIGN PATENT DOCUMENTS

JP         2000-250775         9/2000

\* cited by examiner

*Primary Examiner* — Kamini Patel

(74) *Attorney, Agent, or Firm* — Scully, Scott, Murphy & Presser, P.C.

(57) ABSTRACT

An information processing device may comprise a log file creating unit and a first storage controlling unit. The log file creating unit may be configured to create, each time information is input, one log file that includes log information indicating an input of the information. The storage controlling unit may be configured to store, each time the one log file is created, the one log file in a storage area.

12 Claims, 7 Drawing Sheets

| | Error No. | Time | Error Value | Analysis Result |
|---|---|---|---|---|
| 130 → | 1 | 09:43:01 | XXXX | F1,F2,F4 |
| 132 → | 2 | 10:45:48 | XXXX | |

INFORMATION PROCESSING DEVICE FOR CREATING AND ANALYZING LOG FILES

CROSS-REFERENCE TO RELATED APPLICATIONS

This application claims priority to Japanese Patent Application No. 2009-178938, filed on Jul. 31, 2009, the contents of which are hereby incorporated by reference into the present application.

TECHNICAL FIELD

The present specification discloses an information processing device for creating log files.

DESCRIPTION OF THE RELATED ART

Conventionally, when a check by a user leads to a judgement of equipment failure, a failure analysis support device is installed in the equipment where the failure occurred. The failure analysis support device sets various trigger conditions until the failure is reproduced. The status of the equipment before and after the reproduced failure is stored in a log file storage unit. The user specifies the cause of failure by analyzing log files stored in the log file storage unit.

SUMMARY

In the conventional configuration, the log files cannot be created until the various trigger conditions have been set and the failure has been reproduced. Consequently, the user must spend much time and effort until the log files can even be analyzed. In the present specification, a technique is taught allowing the user to analyze the log files easily.

One aspect of techniques disclosed in the present specification is an information processing device. The information processing device may comprise a log file creating unit and a first storage controlling unit. The log file creating unit may be configured to create, each time information is input, one log file that includes log information indicating an input of the information. The storage controlling unit may be configured to store, each time the one log file is created, the one log file in a storage area.

DETAILED DESCRIPTION OF THE PREFERRED EMBODIMENT

First Embodiment (Configuration of Multi-Function Device 10)

Figure 1:
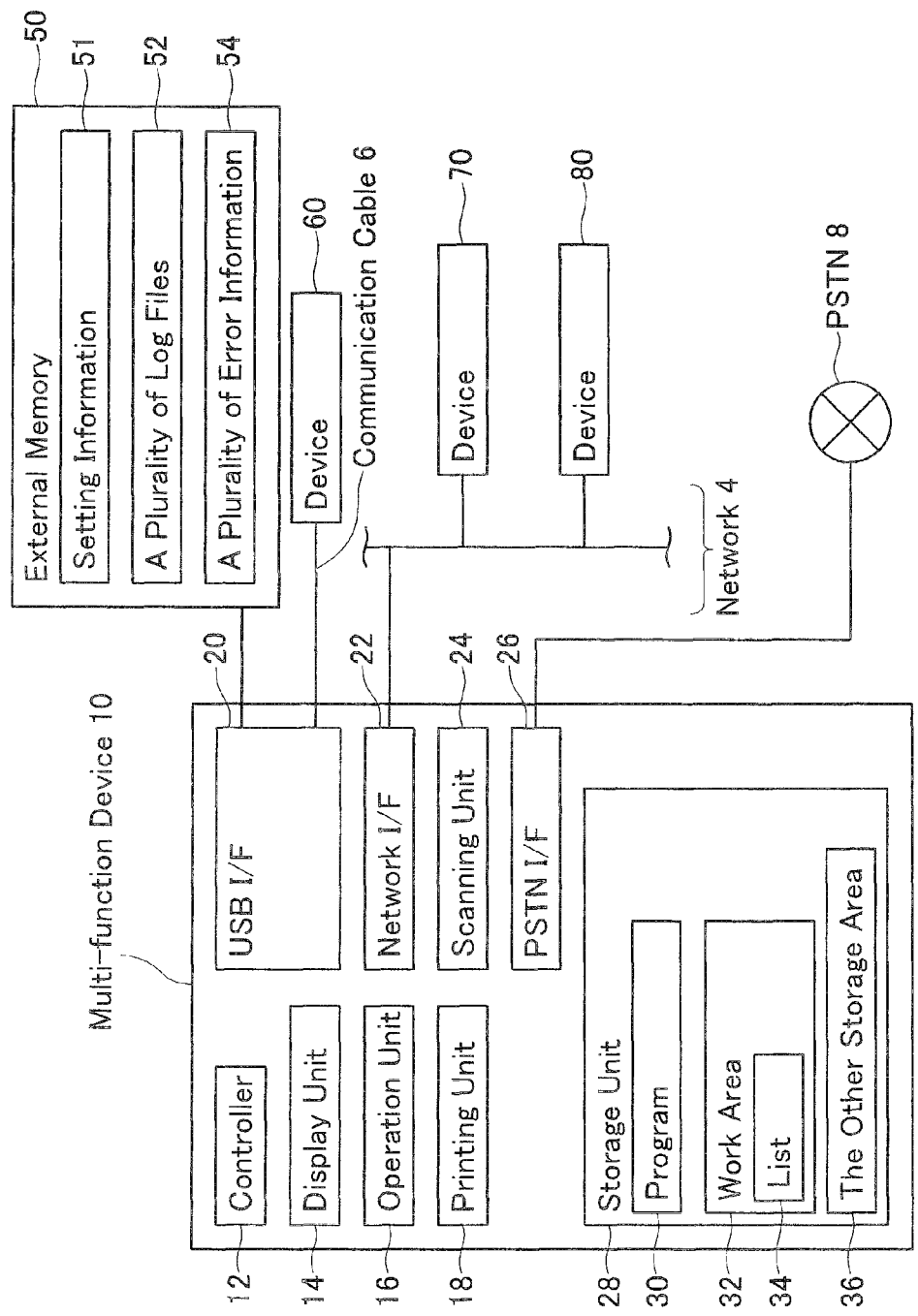
FIG. 1 shows an example of the configuration of a communication system.

The present embodiment will be explained. The configuration of the multi-function device 10 will be explained using FIG. 1. The multi-function device 10 has a plurality of functions including an electronic mail sending and receiving function, scanner function, copy function, printer function, FAX function, etc. The multi-function device 10 comprises a controller 12, display unit 14, operation unit 16, printing unit 18, USB interface 20, network interface 22, scanning unit 24, PSTN interface 26, and storage unit 28. The controller 12 executes processes in accordance with a program 30 stored in the storage unit 28. The storage unit 28 comprises a work area 32. The work area 32 stores information created or acquired by the controller 12 as it executes processes. An example of information stored in the work area 32 is a list 34 (to be described). The storage unit 28 further has another storage area 36 for storing information other than the program 30.

The display unit 14 displays various information. The operation unit 16 comprises a plurality of keys. A user can input various information to the multi-function device 10 by operating the operation unit 16. The printing unit 18 performs printing in accordance with information input from the exterior. Further, the printing unit 18 performs printing in accordance with image data created by the scanning unit 24. The scanning unit 24 creates the image data by scanning a scan object. The USB interface 20 is connected with a communication cable 6 and an external memory 50. The USB interface 20 inputs information output from a device 60. The network interface 22 is connected with a network 4. The network interface 22 inputs information output from devices 70, 80. The PSTN interface 26 is connected with a PSTN 8. The PSTN interface 26 inputs information (e.g., FAX data) output from another device (e.g., FAX) connected with the PSTN 8.

(Configuration of External Memory 50)

The external memory 50 will be explained in detail. The external memory 50 of the present embodiment is a portable USB memory. The external memory 50 stores setting information 51, a plurality of log files 52, and a plurality of error information 54. The setting information 51 is setting information of the multi-function device 10 when a power source thereof is turned ON (e.g., default scan setting (scan resolution, color, etc.), default print setting (print quality, print paper size)).

Figure 2:
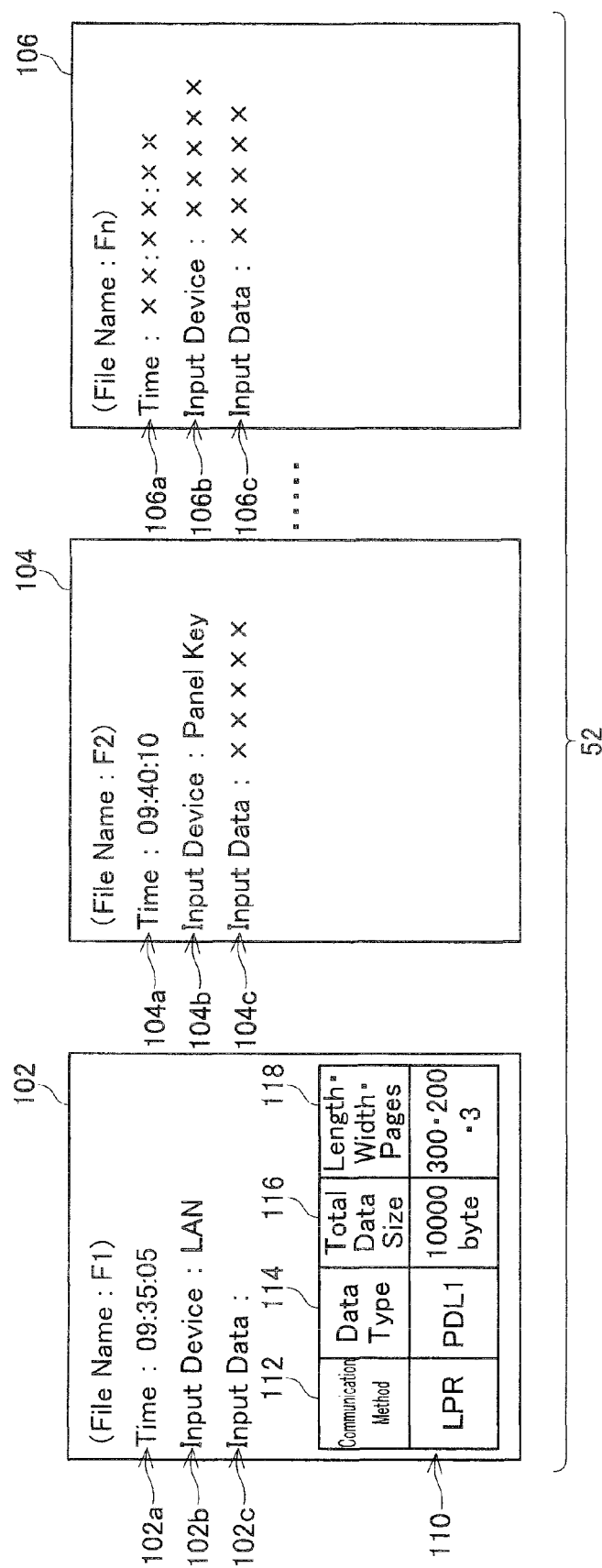
FIG. 2 shows an example of a plurality of log files.

As shown in FIG. 2, the plurality of log files 52 include log files 102 to 106. The log files 102 to 106 include file names F1 to Fn (n is an integer equal to or more than 3), and log information indicating the input of information to the multi-function device 10. The log information includes Time information 102a to 106a, input device information 102b to 106b, and input data 102c to 106c.

The Time information 102a to 106a indicates the time when information was input to the multi-function device 10. The input device information 102b to 106b indicates the type of device that input the information. For example, in a case where information output from the devices 70, 80 has been input to the network interface 22, "LAN" is stored as the input device information (see the log file 102). In a case where information output from the device 60 has been input to the USB interface 20, "USB" is stored as the input device information. In a case where information has been input to the operation unit 16 (if the user has operated the operation unit 16), "panel key" is stored as the input device information (see the log file 104). In a case where information has been input to the PSTN interface 26 via the PSTN 8, "PSTN" is stored as the input device information.

The input data 102c to 106c indicates information that has been input to the multi-function device 10. The input data 102c to 106c differs according to whether the information input to the multi-function device 10 is image data. As print data from the devices 60 to 80, FAX data input via the PSTN 8, etc. is an example of image data. As shown in the log file 102, if the inputted information is image data, the input data 102c is image information data 110. The image information data 110 does not include image data that has actually been input. The image information data 110 is information in which the followings are associated: communication method 112, data type 114, total data size 116, and length, width, and number of pages 118. The communication method 112 indicates a communication method of the data, i.e., a communication protocol. The data type 114 is the type of data (e.g., PEG, PDL (Page Description Language), etc.). The total data size 116 is the total size of the inputted image data. The length, width, and number of pages 118 are the length and width of the inputted image data and the number of print pages (i.e., number of pages) instructed in the image data. If the inputted information is information other than image data, e.g., in a case where the information is a setting-changing instruction, etc. input to the multi-function device 10 from the device 70, etc. via the network 4 by the user operating the keys of the operation unit 16, then input data 104c, 106c does not include the image information data 110, but is data indicating the inputted information, as shown in the log files 104, 106. In a case where a start key of the operation unit 16 has been operated, the input data is data indicating the operation of the start key. In a case where the setting-changing instruction has been input, the input data is data which includes the setting-changing instruction.

Figures 3, 4:
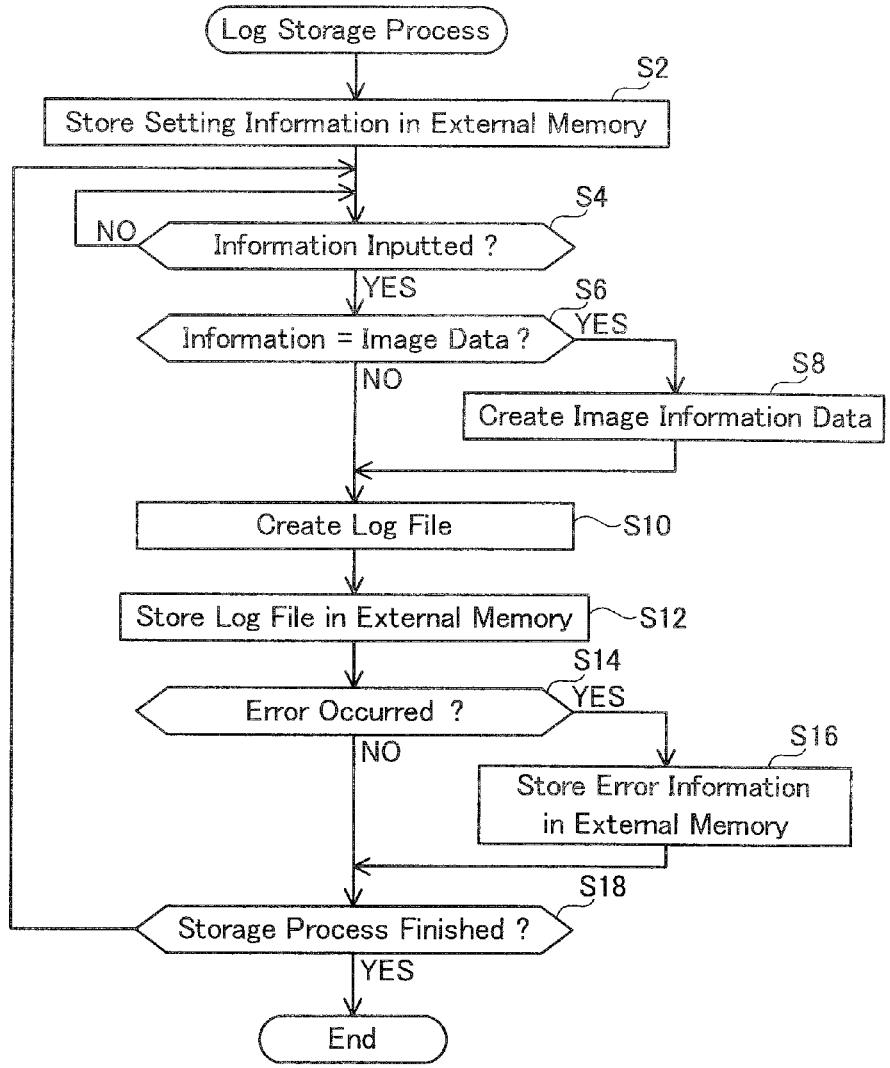
FIG. 3 shows an example of a plurality of error information.
FIG. 4 shows a flowchart of a log storage process.

As shown in FIG. 3, the plurality of error information 54 includes error information 130, 132. The error information 130, 132 is information in which the following are associated: error number 134, Time information 136, error value 138, and analysis result 140. The error number 134 is a number for identifying each piece of error information. The Time information 136 is the time of error occurrence. The error value 138 is a value indicating contents of the error which occurred. Examples of the error value may be "a specific function (e.g., LAN function, print function etc.) in the multi-function device 10 has stopped", "access to false storage area was attempted, consequently the multi-function device 10 was restarted", "time occupied by a function has become extremely large, and the performance of other functions has become slower (e.g., when sending a large amount of data from a LAN while printing data via a USB, processing the large amount of data makes the print process require 5 minutes instead of the usual 20 seconds)", etc. In the present embodiment, the case where the user, but not the printer, judges an error to have occurred is treated as an error. The analysis result 140 is the file name of a log file specified as the cause of the error occurrence as a result of analyzing the error information using an error analysis process (to be described). Moreover, the analysis result 140 is not stored in a case where the error information is not analyzed, as with error information 132.

(Processes Executed by Multi-Function Device 10)

Next, the contents of processes executed by the controller 12 of the multi-function device 10 will be explained. As shown in FIG. 4, when the power source of the multi-function device 10 is turned ON, the controller 12 stores various setting information of the multi-function device 10 in the external memory 50 at the moment the power source is turned ON (S2). Consequently, the external memory 50 stores the setting information 51. Next, the controller 12 monitors whether information has been input to the multi-function device 10 (S4). If information has been input to the network interface 22, to the USB interface 20, to the operation unit 16 (if the user has operated the operation unit 16), or to the PSTN interface 26, the controller 12 determines YES in S4. If the answer is YES in S4, the controller 12 continues to S6.

In S6, the controller 12 judges whether the inputted information is image data. If the information input in S4 is print data from the devices 60 to 80, FAX data input via the PSTN 8, etc., the controller 12 determines YES in S6. If the information input in S4 is setting-changing instruction information from the devices 60 to 80, information input to the operation unit 16, etc., the controller 12 determines NO in S6. If the answer is YES in S6, the controller 12 creates image information data from the inputted image data (S8). By analyzing the inputted image data, the controller 12 specifies the communication method, data type, total data size, length and width of the image data, and the number of print pages instructed with respect to the image data. The controller 12 creates image information data which includes this specified information. If S8 has ended, or if the answer is NO in S6, the controller 12 continues to S10.

In S10, the controller 12 creates a log file (e.g., 102 of FIG. 2). First, the controller 12 creates a file name which includes the current date and time (year, month, day, hour, minute, second). This can prevent the creation of a plurality of log files with the same file name. Next, the controller 12 creates a file having the aforementioned file name. At this step, nothing is written in the file. Next, the controller 12 specifies the current time (hour, minute, second), and writes the specified time in the file. Time information (e.g., 102a of FIG. 2) is thereby written. Further, the controller 12 specifies whether information has been input into any of the devices in S4, and writes the specified device type (LAN, USB, PSTN, panel key) in the file. The input device information (e.g., 102b of FIG. 2) is thereby written. If the information input in S4 is image data, the controller 12 writes the image information data created in S8 in the file. The image information data (e.g., 110 of FIG. 2) is thereby written as the input data. If the information input in S4 is information other than image data, the controller 12 writes the information input in S4 in the file. Input data other than the image information data (e.g., 104c of FIG. 2) is thereby written. The log file is thereby completed.

Upon ending S10, the controller 12 stores the log file in the external memory 50 by sending the created log file thereto (S12). The external memory 50 stores the log file sent from the multi-function device 10 without deleting the log files it is currently storing. The external memory 50 cumulatively stores a plurality of log files (see FIG. 2). Next, the controller 12 judges whether an error has occurred in the multi-function device 10 (S14). If a display error has occurred, a first signal is sent from the display unit 14 to the controller 12. If a communication error has occurred, a second signal is sent from the interface (20, 22, 26, etc.) to the controller 12. If printing has incorrectly halted in the printing unit 18, a third signal is sent from the printing unit 18 to the controller 12. The controller 12 determines YES in S14 if any of the first to the third signals is received during a period from ending S12 until a predetermined period has elapsed.

If the answer is YES in S14, the controller 12 stores, in the external memory 50, error information (e.g., 130 of FIG. 3) relating to the error that has occurred (S16). The controller 12 has acquired in advance (e.g., when the power source was turned ON) the largest error number 134 (see FIG. 3) among the plurality of pieces of error information stored in the external memory 50. The controller 12 creates a new error number by adding "1" to the acquired error number. Moreover, in the process S16 which is executed the second time after the power source was turned ON, as well as in the times following the second time, the multi-function device 10 creates a new error number by adding "1" to the error number created in the process S16 of the previous time. Next, the controller 12 specifies the current time and error value. Although not shown in the figures, the error values are stored in advance in the storage area 36 of the multi-function device 10 for each of a plurality of types of errors. The controller 12 specifies the error value by retrieving the storage area 36 using the type of error which has occurred. The controller 12 sends the created error number, the specified time, and the specified error value to the external memory 50. Consequently, the external memory 50 stores new error information which includes the error number, time, and error value sent from the multi-function device 10. At this juncture, the external memory 50 stores the new error information without deleting the error information which it is currently storing. The external memory 50 cumulatively stores a plurality of error information.

If S16 has ended, or if the answer is NO in S14, the controller continues to S18. In S18, the controller 12 judges whether to end the log storage process at this time. The user can, e.g., store a specific setting in advance in the multi-function device 10 to end the log storage process when one error has occurred. If the answer is YES in S14 and the specific setting has been stored, the controller 12 determines YES in S18. In this case, the log storage process ends, and log files are not created even if information is subsequently input. If the specific setting is not being stored, or if the answer is NO in S14, the controller 12 determines NO in S18. In this case, the controller 12 returns to S4, and monitors whether information has been input. As described above, the plurality of log files 52 and the plurality of error information 54 (see FIGS. 2, 3) is stored in the external memory 50 by the log storage process of FIG. 4.

Figure 5:
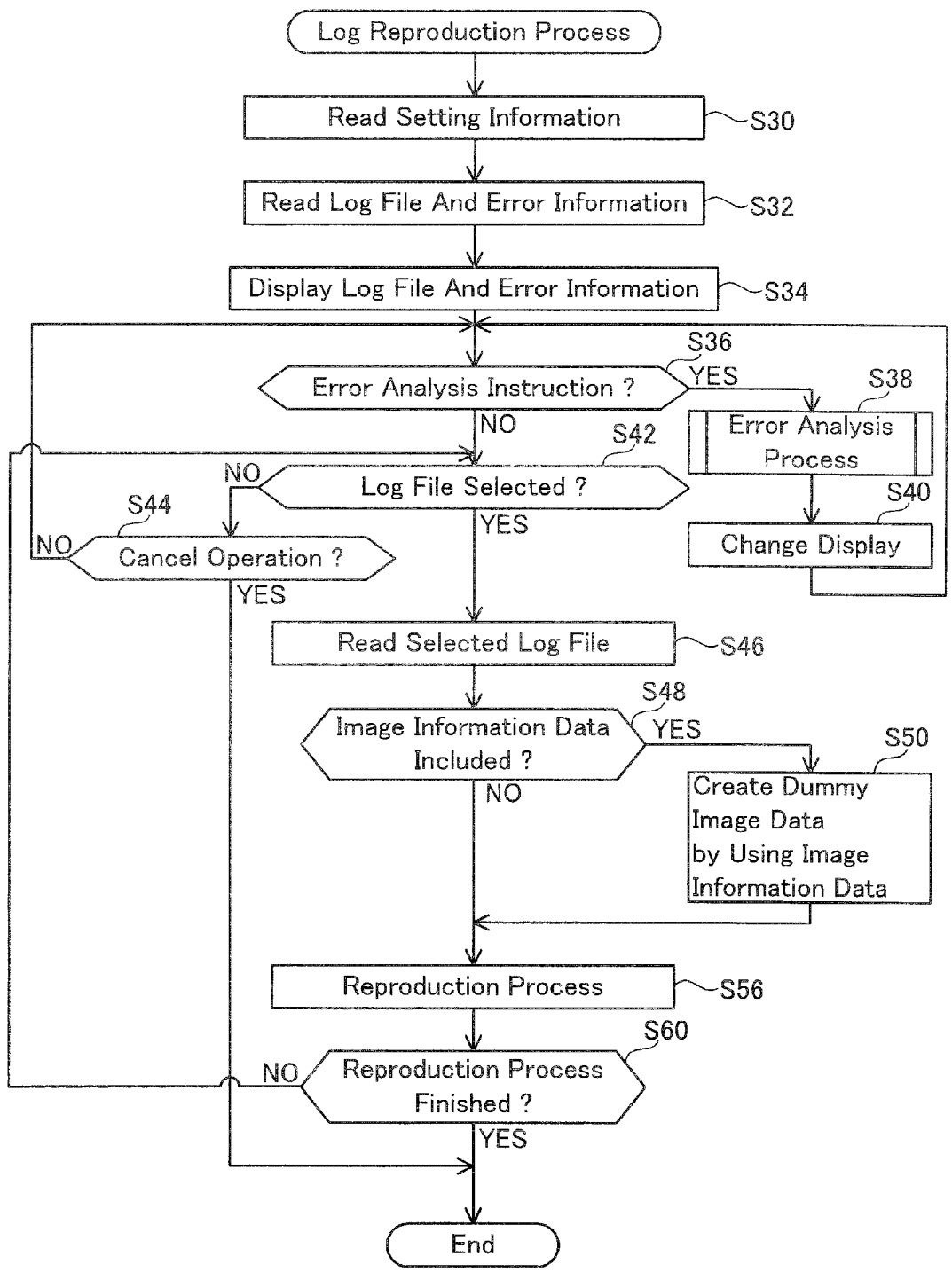
FIG. 5 shows a flowchart of a log reproduction process.

Next, a process will be described, using FIG. 5, for reproducing an operation corresponding to the log information included in the log file (e.g., 102). This log reproduction process is executed if the user operates the operation unit 16 to input a log reproduction executing instruction. The log reproduction executing instruction may be input via any of the interfaces 20, 22, 26.

First, the controller 12 reads the setting information 51 stored in the external memory 50 (S30). Further, the controller 12 changes the current settings of the multi-function device 10 to the settings included in the setting information 51 (i.e., the settings when the power source of the multi-function device 10 is turned ON). Next, the controller 12 reads the log files 52 and the error information 54 stored in the external memory 50 (S32). The controller 12 displays the error information 54 and the file names of the log files 52 in the display unit 14 (S34). The controller 12 monitors whether an error analysis process executing instruction has been input (S36). The controller 12 determines YES in S36 if one piece of error information (e.g., 132 of FIG. 3) has been selected from among the plurality of error information 54 displayed in the display unit 14 and a predetermined operation has been performed in the operation unit 16. Moreover, the error analysis process executing instruction may be input via any of the interfaces 20, 22, 26.

If the answer is YES in S36, the controller 12 executes the error analysis process for the error information selected in S36 (termed "selected error information" below) (S38). The error analysis process will be described in detail later. In S38, 1 or 2 or more log files that are the cause of the error are specified as the error cause. Next, in S40, the controller 12 first sends the file names of the 1 or 2 or more log files specified as the error cause and the error number 134 (see FIG. 3) of the selected error information to the external memory 50. The external memory 50 writes the file names of the 1 or 2 or more received log files in a column for the analysis result 140 (see FIG. 3) of the received error information that has the error number 134. Further, the controller 12 updates the analysis result column of the selected error information displayed in the display unit 14 to the file names of the 1 or 2 or more log files. Upon ending S40, the controller 12 returns to S36.

The controller 12 further monitors whether 1 or 2 or more log files have been selected by the user from among the file names of the log files 52 displayed in the display unit 14 (S42). The user can select the 1 or 2 or more log files by operating the operation unit 16. If the answer is YES in S42 the controller 12 continues to S46. Below, the log files selected here are termed "selected log files". If two or more log files are selected, these do not need to have been created consecutively in an order of log file creation. For example, the user may select the log files that were created third and fifth in the order of log file creation without selecting the log file that was created fourth in the order thereof.

The controller 12 monitors whether the user has performed a cancel operation (S44). If the answer is YES in S44, the log reproduction process ends. In S46, the controller 12 reads, from the external memory 50, the log information (Time information 102a, etc., input device 102b, etc., input data 102c, etc., (see FIG. 2)) included in the 1 or 2 or more selected log files (S46). Next, the controller 12 judges whether the log information read in S46 includes the image information data (e.g., 110 of FIG. 2) (S48). If the answer is YES in S48, the controller 12 creates dummy image data by using the image information data (S50). Specifically, the controller 12 specifies the data type 114, the total data size 116, and the length, width, and number of pages 118 (see FIG. 3) included in the image information data, and creates the dummy image data by using this specified information and a sample image that has been determined in advance. This sample image may be stored in the storage unit 28 or in the external memory 50. If S50 has ended, or if the answer is NO in S48, the controller 12 continues to S56.

In S56, after the settings of the multi-function device 10 have been made to be the settings shown in the setting information 51 read in S30, the controller 12 executes, in accordance with the order of log file creation of the selected log files, a reproduction process for sequentially reproducing operations corresponding to the log information included in the log files (S56). If the selected log files indicate a key operation, that key operation is reproduced. Consequently, if the key operation indicates a scan starting operation, the controller 12 actually executes a scan. If the key operation is an operation for executing a predetermined display in the display unit 14, the controller 12 actually executes the predetermined display in the display unit 14. If the selected log files indicate the input of print data via the network 4 or the input of FAX data via the PSTN 8, the controller 12 actually performs printing in accordance with the dummy image data created in S50 using the image information data 110 (see FIG. 3) corresponding to the print data or FAX data. If the selected log files indicate a change to the setting of the multi-function device 10, the controller 12 actually executes the change to the setting (e.g., a change in scan resolution, etc.).

Upon ending S56, the controller 12 displays a letter string at this timing in the display unit 14 asking the user whether to end the log reproduction process. If the user selects "end", the controller 12 determines YES in S60, and ends the log reproduction process. When the log reproduction process ends, the controller 12 can reset the settings of the multi-function device 10 to the settings that were in place before starting the log reproduction process. If the user selects "continue", the controller 12 determines NO in S60, and returns to S42. In that case, the controller 12 returns the settings of the multi-function device 10 to the settings indicated by the setting information 51 read in S30.

Next, the error analysis process executed by the controller 12 in S38 of FIG. 5 will be described with reference to FIGS. 6, 7. As described above, the error analysis process is started by the user executing the error analysis process executing instruction. As described above, the error analysis process executing instruction is executed by one piece of error information (e.g., 132 of FIG. 3) being selected, and the predetermined operation being executed in the operation unit 16. When the error analysis process is started, the controller 12 first reads the selected error information (S80). Next, the controller 12 specifies a log file having the newest Time information 102a, etc., which is a log file having its Time information 102a, etc., (see FIG. 2) before the time (error occurrence time) indicated in the Time information 136 (see FIG. 3) that is included in the selected error information (S82). Next, the controller 12 executes the processes S46 to S56 of FIG. 5 with the one log file specified in S82 as the selected log file (S84). Moreover, in the process S52 of this case, the controller 12 judges whether a log file which includes the setting-changing instruction as the input data is present during the period from the time the power source of the multi-function device 10 was turned ON until the Time information included in the log file specified in S82.

Figure 8:
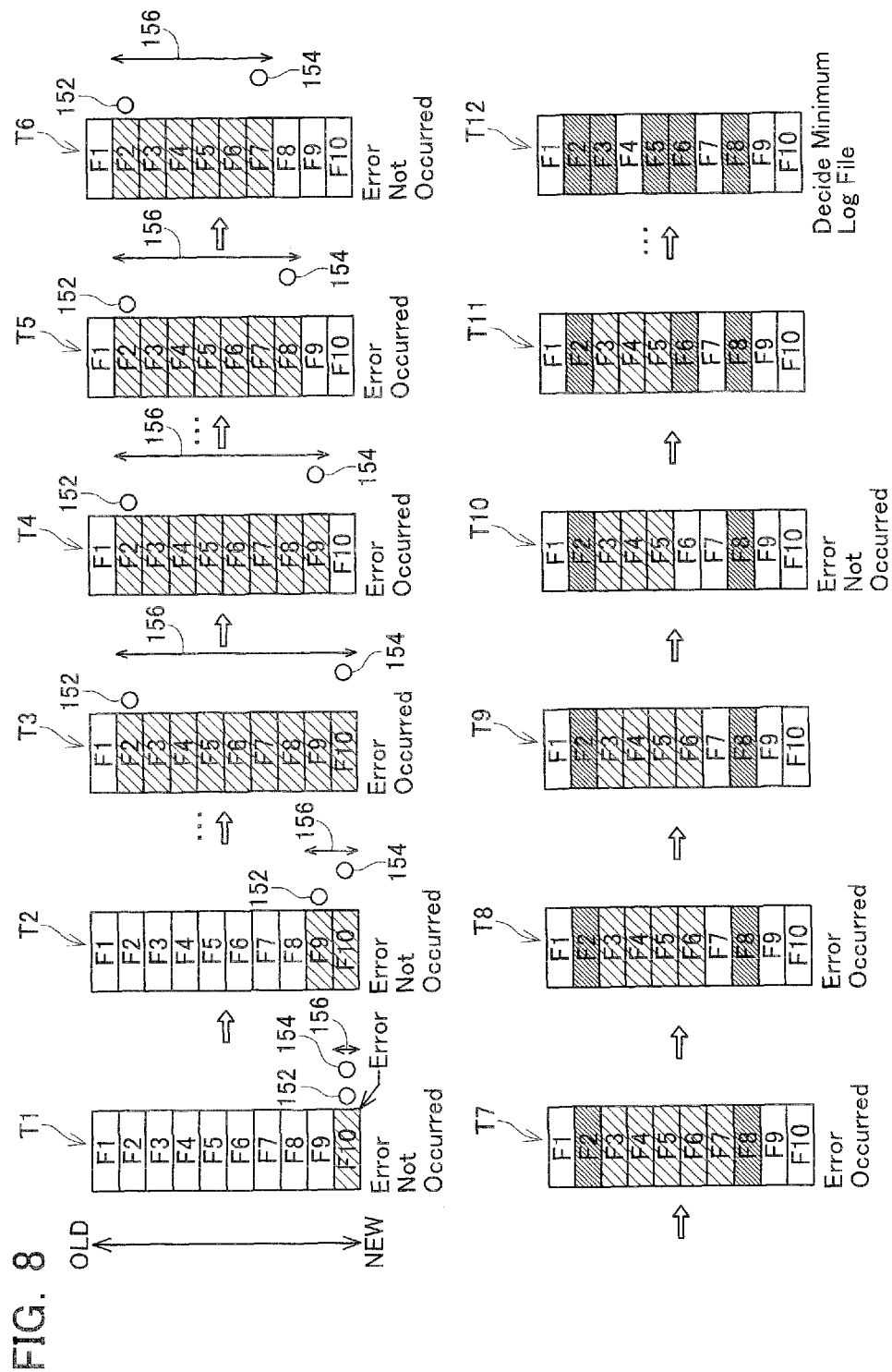
FIG. 8 is a figure for explaining the error analysis process.

With T1 of FIG. 8 as an example, in S82 the controller 12 specifies one log file F10 directly before the error occurrence time. Next, in S84, the controller 12 executes the reproduction process by using the log file F10. Further, in a case where, e.g., F1 and F4 are log files that include the setting-changing instruction as the input data, the controller 12 executes the reproduction process by using F1, then executes the reproduction process by using F4, then executes the reproduction process by using F10.

Next, the controller 12 judges whether an error has occurred in the multi-function device 10 as a result of the process S84 (i.e., the reproduction process) (S86). The judgement of whether an error has occurred is the same as that performed by the controller 12 in S14 of FIG. 4. Below, as well, the judgement of whether an error has occurred is the same as that of S14 of FIG. 4. If the answer is YES in S86, the controller 12 ends the error analysis process. In this case, the one log file (F10) specified in S82 is specified as the cause of the error. As described above, when the error analysis process ends, the controller 12 returns to S40 of FIG. 5.

If the answer is NO in S86, the controller 12 specifies the log file directly before the log file specified in S82 (S88). With T2 of FIG. 8 as an example, in S88 the controller 12 specifies one log file F9. Next, the controller 12 executes the processes S46 to S56 of FIG. 5 with the log file F9 specified in S88 as a head file 152, the log file F10 specified in S82 as an end file 154, and the plurality of log files present between the head file 152 and the end file 154 as the selected log files (S90). The number 156 in FIG. 8 indicates the range of log files for which the processes S46 to S56 of FIG. 5 are executed in S84 or S90. In S90, the reproduction process is executed by using the log file F9, and then the reproduction process is executed by using the log file F10. Moreover, if a log file which includes the setting-changing instruction is present before F9, the reproduction process using the log file which includes the setting-changing instruction is executed (i.e., setting changing is executed) before executing the reproduction process using the log file F9. Next, the controller 12 judges whether an error has occurred in the multi-function device 10 as a result of the process S90 (S92).

If the answer is NO in S92, the controller 12 returns to S88 and specifies the log file directly before the previously specified log file. With T2 of FIG. 8 as an example, the controller 12 specifies a log file F8. Next, the controller 12 executes the processes S90, S92 with the log file F8 as the head file 152 (the log file F10 is the end file 154). The controller 12 repeats the processes S88 to S92 until YES is determined in S92. In the example T3 of FIG. 8, YES is determined in S92 in a case where the process S90 is executed for the range 156 of log files, with a log file F2 as the head file 152.

If the answer is YES in S92, the controller 12 decides the log file F2 specified in S88 is the head file 152 (S94). Next, the controller 12 specifies, as the new end file 154, the log file F9 directly before the log file F10 that is the current end file 154 (S96). T4 of FIG. 8 shows the end file 154 having been changed to the log file F9. Next, the controller 12 executes the processes S46 to S56 of FIG. 5 with selected log files, these being the plurality of log files present between the log file F2, which is the head file 152, and the log file F9, which is the end file 154 (S98). Next, the controller 12 judges whether an error has occurred in the multi-function device 10 as a result of the process S98 (S100). If the answer is YES in S100, the controller 12 returns to S96, specifies the log file directly before the log file that is the current end file 154 as the new end file 154, and executes the processes S98, S100. T5 of FIG. 8 shows the end file 154 having been changed to the log file F8. The controller 12 repeats the processes S96 to S100 until NO is determined in S100. Moreover, T6 of FIG. 8 shows the range 156 with NO having been determined in S100 in a case where the process S98 has been executed with a log file F7 as the end file 154.

If the answer is NO in S100, the controller 12 decides that the end file 154 is the log file F8, this being one file after the log file F7, which was the previous end file 154 in S96 (S102). The processes S80 to S102 are used to determine a head file and an end file for the successive log files needed to cause an error to occur. T7 of FIG. 8 shows this determination having been made from the log file F2, which is the head file, to the log file F8, which is the end file. The successive log files decided in S102 is the smallest range of successive log files in which an error occurs if the processes S46 to S56 of FIG. 5 are executed. Upon ending S102, the controller 12 continues to S120.

In S120, the controller 12 registers, in the list 34 (see FIG. 1), a plurality of log files from the log file F2, which is the head file, to the log file F8, which is the end file. Next, the controller 12 specifies one log file from the list 34 (S122). In S122, the log file F2, which is the head file, and the log file F8, which is the end file, are not specified from the list 34. This is because the log file F2, which is the head file, and the log file F8, which is the end file, have already been specified in S88 or S96 of FIG. 6, and at least the log files F2, F8 were assumed to be the cause of the error occurrence. Next, the controller 12 executes the processes S46 to S56 of FIG. 5 for the plurality of log files in the list 34, except for the one log file specified in S122 (S124). T8 of FIG. 8 shows the processes S46 to S56 of FIG. 5 having been executed for the log files F2 to F6 and F8 except for the log file F7 as a result of specifying the log file F7 in S122.

Next, the controller 12 judges whether an error has occurred in the multi-function device 10 as a result of the process S124 (S126). If the answer is YES in S126, this means that the operation corresponding to the log information included in the one log file F7 specified in S122 was not the cause of the error occurrence. Consequently, the controller 12 excludes the log file F7 specified in S122 from the list 34 (S128). T9 of FIG. 8 shows the log file F7 having been deleted from the list 34. If S128 has ended, the controller 12 continues to S130. If the answer is NO in S126, this means that the operation corresponding to the log information included in the one log file specified in S122 was the cause of the error occurrence. Consequently, the controller 12 continues to S130 without excluding the log file specified in S122 from the list 34. In S130, the controller 12 judges whether all the log files in the list 34 excepting the log file F2, which is the head file, and the log file F8, which is the end file, were specified in S122. If the answer is NO in S130, the controller 12 returns to S122, specifies the one other log file F6 that has not yet been specified from the list 34, and executes the processes S46 to S56 of FIG. 5 (S124). T10 of FIG. 8 shows the processes S46 to S56 of FIG. 5 having been executed for the log files F2 to F5 and F8 excluding the log file F6. In this case, as described above, the log file F6 is not excluded from the list 34 if NO is determined in S126. T11 of FIG. 8 shows the log file F6 not having been excluded from the list 34.

If the answer is YES in S130, the error analysis process ends. In this case, the plurality of log files included in the log files remaining in the list 34 at the time YES is determined in S130 is specified as the cause of the error occurrence. The minimum number of log files that were the cause of the error occurrence were ascertained using the error analysis process. T12 of FIG. 8 shows F2, F3, F5, F6, F8 having been specified as the minimum number of log files that are the cause of the error occurrence.

The multi-function device 10 of the present embodiment was explained in detail above. In the multi-function device 10 of the present embodiment, each time information is input, the controller 12 creates one log file which includes log information indicating the input of the information, and stores this log file in the external memory 50, as shown in S4 to S12 of FIG. 4. Consequently, with the input of information to the multi-function device 10 as a trigger, a log file indicating the input of information is created each time the information is input. The user no longer needs to wait for the creation of log files in order to reproduce the failure. The time and effort needed to create the conventional log files may be avoided. As a result, the user can analyze the log files easily.

In the multi-function device 10 of the present embodiment, each time an error occurrence is detected, the controller 12 stores error information indicating the error occurrence in the external memory 50, as shown in S14, S16 of FIG. 4. Then, as shown in S82, S84 of FIG. 6, in accordance with the error analysis process executing instruction of the user, the controller 12 first specifies the one log file directly before the error occurrence time, and then executes the reproduction process (the processes S46 to S56 of FIG. 5) to reproduce the operation corresponding to the log information included in that log file. Consequently, the log file indicating the input of information that is the cause of the error occurrence can be specified, and the operation can be reproduced using that log file. The user can confirm whether the same error is occurring by looking at the reproduction results of the operation. Further, since the user can execute the reproduction process in accordance with the error analysis process executing instruction, the user can execute the reproduction process at a desired time.

The occurrence of an error is caused not only by the input of information directly before the error occurrence. An error can be caused by a combination of information that is input directly before the error occurrence, and information that is input even earlier. In order for the user to be able to confirm whether this is the case, in the multi-function device 10 of the present embodiment, in S86 to S94 of FIG. 6 as shown in T1 to T3 of FIG. 8, the controller 12 judges whether the occurrence of an error has been detected by performing the reproduction process for the one log file directly before the error occurrence time and, if a negative judgement is made, specifies another log file directly before the specified log file; specifies the other log file as a head file (e.g., 152 of T3 of FIG. 8); specifies the one log file directly before the error occurrence time as an end file (e.g., 154 of T3 of FIG. 8); and executes the reproduction process (S46 to S56 of FIG. 5) that sequentially reproduces the plurality of operations corresponding to the plurality of log information included in the log files present between the head file and the end file. An operation is reproduced that corresponds to the log information included in the log file which is the head file, this log file having been created before the log file that was created directly before the error occurrence (the end file). Next, an operation is reproduced that corresponds to the log information included in the log file which was created following the head file (this log file may be the end file). This process is repeated until an operation using the log file which is the end file is reproduced. The user can specify the cause of the error occurrence by seeing how the plurality of operations are reproduced.

In a case where first information has been input, then second information has been input, then third information has been input, and an error has occurred upon the input of the third information, this error may be caused by the input of the first and third information regardless of the input of the second information. Hence, a multiple operation reproduction process is executed using the plurality of log files that are created in succession, and from the results thereof; when an error occurs, all of the log files may not necessarily be related to the occurrence of the error. In order to specify the cause of the error occurrence more specifically, in the multi-function device 10 of the present embodiment, in S120 to S130 of FIG. 7, as shown in T7 to T12 of FIG. 8, the controller 12 registers the plurality of log files (e.g., F2 to F8 of T7 of FIG. 8) from the head file to the end file in the list 34 (see FIG. 1), specifies one log file from the list 34, and executes the reproduction process for the log files consisting of the log files in the list 34 excluding the specified log file. If the error still occurs as a consequence of this, the specified log file is excluded from the list 34. The user can learn that the one excluded log file is not related to the error occurrence. The user can thus specify the cause of the error occurrence more specifically.

Figure 7:
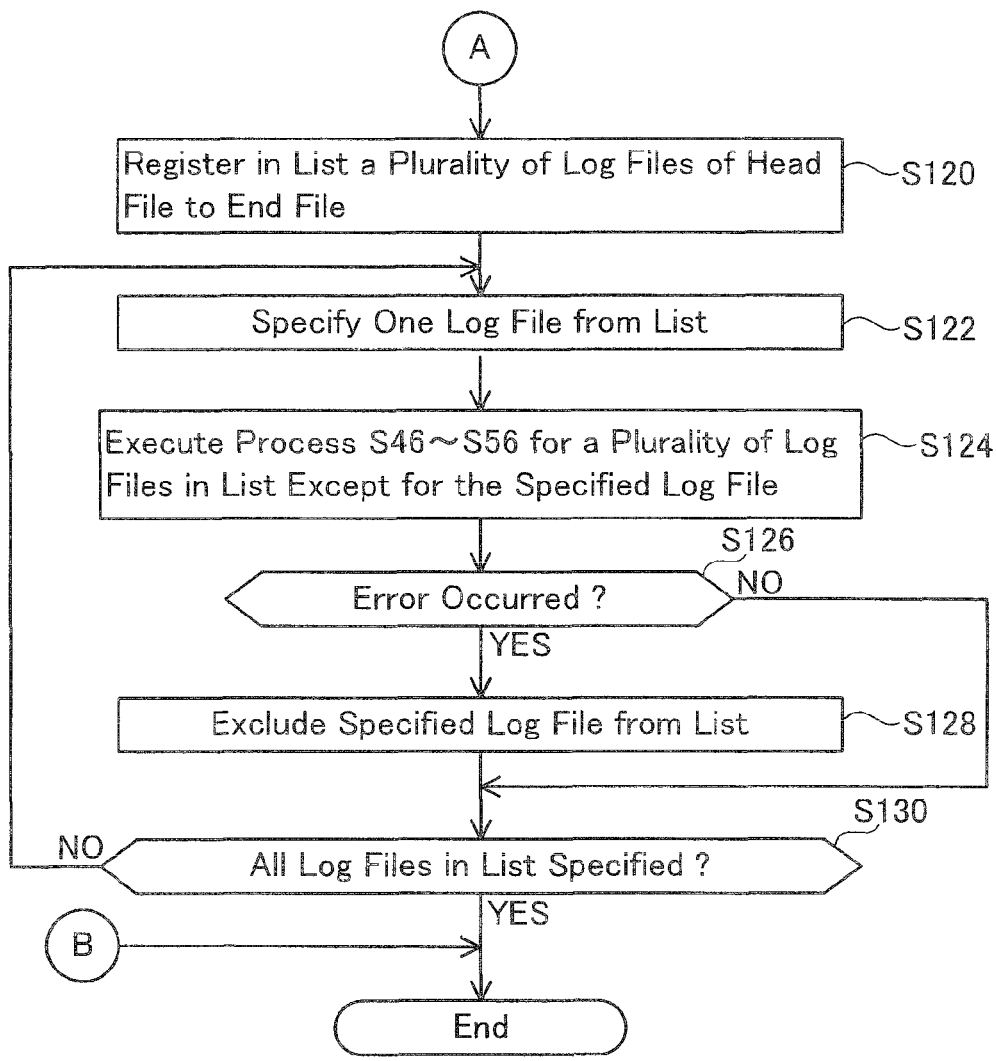
FIG. 7 shows a continuation of the flowchart of the error analysis process.

Further, in the multi-function device 10 of the present embodiment, the controller 12 repeats the processes S120 to S130 of FIG. 7 until all the log files in the list 34 have been specified. Consequently, the user can specify the minimum number of log files relating to the error occurrence that finally remained in the list 34. Consequently, the user can analyze the log files easily.

In the multi-function device 10 of the present embodiment, as shown in S6 and S8 of FIG. 4, if the inputted information is image data, the controller 12 creates the image information data specifying the image data and stores this in the external memory 50. Further, as shown in S48 and S50 of FIG. 5, if an operation corresponding to the specific log information that includes the image information data is reproduced, the controller 12 performs the reproduction using the dummy image data created from the image information data. Since log files that include large capacity image data are not created, the capacity of the log files can be restricted. Further, during reproduction, the image data is reproduced using the dummy image data and not the image data that was actually input. Consequently, an operation can be reproduced that is almost identical to the operation executed in accordance with the input of image data.

A portion of the technique of the above embodiment may be represented as below. The information processing device may further comprise a plurality of information inputting units. When information is input to any of the information inputting units, the log file creating unit may create one log file that includes log information indicating the input of information each time the information is input.

The correspondence between elements of the embodiments and elements of the present invention will be given. The multi-function device 10 and the external memory 50 are respectively an example of the "information processing unit" and the "storage area". The processes S4 to S10 of FIG. 4 and the process S12 of FIG. 4 are respectively examples of processes executed by the "log file creating unit" and the "first storage controlling unit". The process S14 of FIG. 4, the processes S82, S88, S96 of FIG. 6, the processes S120, S122, S128, S130 of FIG. 7, and the processes S46 to S56 of FIG. 5 are respectively examples of processes executed by the "error detecting unit", "log file specifying unit", and "reproducing unit". The process S16 of FIG. 4 and the process S36 of FIG. 5 are respectively examples of processes executed by the "second storage controlling unit" and the "selection allowing unit". The processes S86, S92, S100, S126 of FIG. 6 are examples of processes executed by the "judging unit". The process S8 of FIG. 4 and the process S50 of FIG. 5 are respectively examples of processes executed by the "image information data creating unit" and the "dummy image data creating unit". The log files specified in S82 of FIG. 6 and the log files specified in S88 of FIG. 6 are respectively examples of the "first log file" and "second log file". In the multi-function device 10 of the present embodiment, as described above, the log files indicating the input of information are created with the input of information as the trigger. The external memory 50 does not store the status of a period in which information is not input. Consequently, compared to a configuration which stores the status of a period in which information is not input, status over a long period (i.e., a log file for each piece of information input over a long period) can be recorded. The user can be provided with the status over a long period in the past.

Second Embodiment

Figure 6:
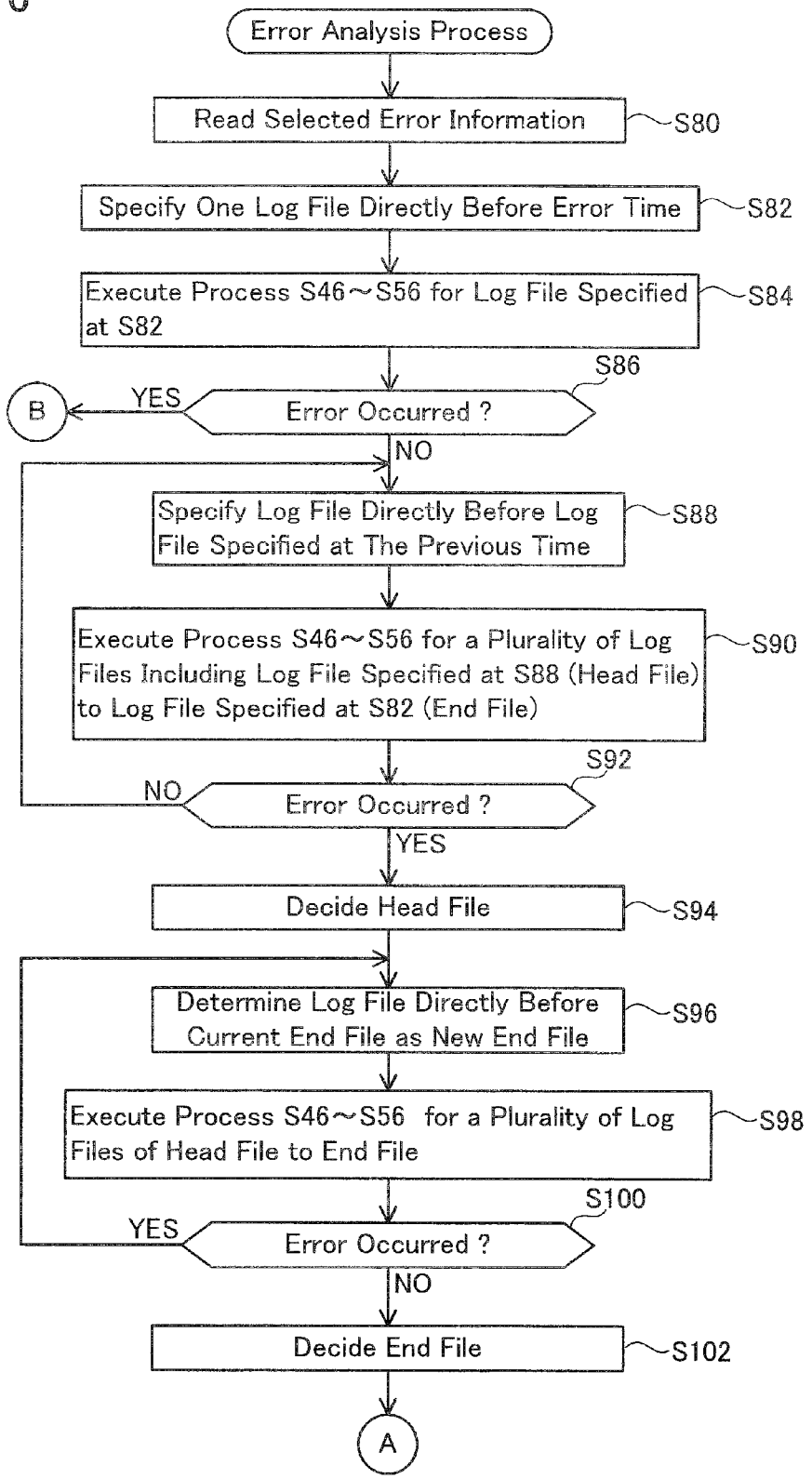
FIG. 6 shows a flowchart of an error analysis process.

In the first embodiment, the error analysis process shown in FIGS. 6, 7 was performed due to the user giving the error analysis process executing instruction. In the present embodiment, the error analysis process is performed right after the controller 12 detects an error occurrence regardless of whether the user has instructed the error analysis process. I.e., the controller 12 executes the error analysis process S38 of FIG. 5 right after S16 of FIG. 4. In S80 of FIG. 6 in this error analysis process, the controller 12 reads the error information stored in the external memory 50 (the error information corresponding to the error that occurred directly beforehand) in S16 of FIG. 4. The user can see the reproduction results right after the error has occurred. Moreover, the sentence "the log file specifying unit is configured to specify the first log file right after the specific error is detected" may, also be phrased e.g., "the log file specifying unit is configured to specify the first log file right after the specific error is detected even without an instruction from the user."

Specific examples of the present invention are described above, but these merely illustrate some possibilities of the invention and do not restrict the claims thereof, The art set forth in the claims includes variations and modifications of the specific examples set forth above. Variations of the embodiments can, e.g., be given below.

In the error analysis process, the process until the minimum of 1 or 2 or more log files relating to the error occurrence (see T12 of FIG. 8) is specified from among the plurality of log files is not limited to the process taught in the above embodiments, but can differ as desired. For example, S96 to S102 of FIG. 6 may be omitted. Upon ending S94 of FIG. 6, the controller 12 may continue to S120 of FIG. 7.

Further, the setting information 51, log files 52, and error information 54 are not limited to being stored in the external memory 50, but may, e.g., be stored in the storage unit 28. Further, the minimum number of log files that are specified by the error analysis process to be the cause of the error occurrence may be treated as one log file. If the log files that are the cause of the error occurrence have been selected using S42, a plurality of log files that are the cause of the error occurrence may all be reproduced sequentially even if the log file selected by the user is one log file. Further, any selected log file may be reproduced freely regardless of whether an error has occurred.

Moreover, the technique taught in the present specification may be realized in various aspects including a control method for realizing an information processing device, a computer program, and a recording medium, etc. for recording the computer program, etc.

What is claimed is:

1. An information processing device comprising:
   a log file creating unit configured to create, each time information is input, one log file that includes log information indicating an input of the information;
   a first storage controlling unit configured to store, each time the one log file is created, the one log file in a storage area;
   an image information data creating unit configured to create image information data that specifies image data in a case where the inputted information is the image data, wherein the image information data does not include the image data, and the image information data is used for creating dummy image data; and
   a printing unit configured to perform printing in accordance with the image data in the case where the inputted information is the image data,
   wherein, in the case where the inputted information is the image data, the log file creating unit is configured to create a log file that includes predetermined log information having the image information data.

2. The information processing device as in claim 1, further comprising:
   an error detecting unit configured to detect an occurrence of an error caused by the input of the information;
   a log file specifying unit configured to specify a first log file from the storage area in a case where an occurrence of a specific error caused by an input of specific information is detected, wherein the first log file includes specific log information indicating the input of the specific information; and
   a reproducing unit configured to execute a reproduction process that reproduces an operation corresponding to the specific log information included in the first log file.

3. The information processing device as in claim 2, further comprising:
   a second storage controlling unit configured to store, each time the occurrence of the error is detected, error information indicating the occurrence of the error in the storage area; and
   a selection allowing unit configured to allow a user to select one error information among a plurality of error information stored in the storage area, wherein in a case where specific error information indicating the occurrence of the specific error is selected by the user, the log file specifying unit is configured to specify the first log file.

4. The information processing device as in claim 2, wherein
the log file specifying unit is configured to specify the first log file right after the specific error is detected.

5. The information processing device as in claim 2, further comprising:
a judging unit configured to judge, in a case where the reproduction process is executed, whether the occurrence of the error is detected,
wherein, in a case where a negative judgment is made by the judging unit,
the log file specifying unit is configured to further specify from the storage area a second log file that has been created before the first log file,
the reproducing unit is configured to further execute a multiple operations reproduction process that sequentially reproduces N operations corresponding to N pieces of log information included in N log files from the second log file to the first log file in accordance with the order of log file creation of the N log files, and
the N is an integer that is equal to or more than 2.

6. The information processing device as in claim 5, wherein
the second log file is a log file that has been created directly before the first log file in the order of log file creation,
wherein, in a case where the negative judgment is made by the judging unit upon execution of the multiple operations reproduction process,
the log file specifying unit is configured to:
specify from the storage area another log file that has been created directly before the second log file in the order of log file creation; and
repeat specifying from the storage area another log file that has been created directly before the log file that has been specified the previous time until a positive judgment is made by the judging unit, and
the reproducing unit is configured to execute, each time the log file is specified by the log file specifying unit, a new multiple operations reproduction process that sequentially reproduces a plurality of operations corresponding to a plurality of pieces of log information included in a plurality of log files from the specified log file to the first log file in accordance with the order of log file creation of the plurality of log files.

7. The information processing device as in claim 5, wherein
the log file specifying unit is configured to further execute an object log file specifying process that specifies one object log file among M log files that were used in the multiple operations reproduction process for which the positive judgment has been made by the judging unit,
the M is an integer that is equal to or more than 2,
the reproducing unit is configured to further execute a partial operation reproduction process that reproduces one or more operations corresponding to one or more pieces of log information included in one or more log files excluding the object log file among the M log files.

8. The information processing device as in claim 7, wherein
the log file specifying unit is configured to sequentially specify one new object log file that has not yet been specified as the object log file among the M log files, wherein, each time the new object log file is specified by the log file specifying unit, the reproducing unit is configured to further reproduce:
in a case where the positive judgment is made by the judging unit upon a previous execution of the partial operation reproduction process, one or more operations corresponding to one or more pieces of log information included in one or more log files excluding the specified new object log file among log files which were used in the previous execution of the partial operation reproduction process; and
in a case where the negative judgment is made by the judging unit upon the previous execution of the partial operation reproduction process, one or more operations corresponding to one or more pieces of log information included in one or more log files excluding the specified new object log file among the log files which were used in the previous execution of the partial operation of the reproduction process, the one or more log files including an object log file that has been excluded the previous time.

9. The information processing device as in claim 2, further comprising:
a dummy image data creating unit configured to create the dummy image data from the image information data, wherein,
in a case where an operation corresponding to the predetermined log information is to be reproduced, the reproducing unit is configured to reproduce the operation corresponding to the predetermined log information by using the dummy image data created from the image information data.

10. The information processing device as in claim 1, wherein
the image information data includes two or more of a communication method which has been used for communicating the image data, a type of the image data, a total data size of the image data, a length of the image data, a width of the image data, and the number of print pages of the image data.

11. An information processing device comprising:
a log file creating unit configured to create, each time information is input, one log file that includes log information indicating an input of the information;
a first storage controlling unit configured to store, each time the one log file is created, the one log file in a storage area;
an error detecting unit configured to detect an occurrence of an error caused by the input of the information;
a log file specifying unit configured to specify a first log file from the storage area in a case where an occurrence of a specific error caused by an input of specific information is detected, wherein the first log file includes specific log information indicating the input of the specific information;
a reproducing unit configured to execute a reproduction process that reproduces an operation corresponding to the specific log information included in the first log file; and
a judging unit configured to judge, in a case where the reproduction process is executed, whether the occurrence of the error is detected,
wherein, in a case where a negative judgment is made by the judging unit,
the log file specifying unit is configured to further specify from the storage area a second log file that has been created before the first log file, the reproducing unit is configured to further execute a multiple operations reproduction process that sequentially reproduces N operations corresponding to N pieces of log information included in N log files from the second log file to the first log file in accordance with an order of log file creation of the N log files, and the N is an integer that is equal to or more than 2.

12. An information processing device comprising:

a log file creating unit configured to create, each time information is input, one log file that includes log information indicating an input of the information;

a first storage controlling unit configured to store, each time the one log file is created, the one log file in a storage area;

an error detecting unit configured to detect an occurrence of an error caused by the input of the information;

a log file specifying unit configured to specify a first log file from the storage area in a case where an occurrence of a specific error caused by an input of specific information is detected, wherein the first log file includes specific log information indicating the input of the specific information;

a reproducing unit configured to execute a reproduction process that reproduces an operation corresponding to the specific log information included in the first log file;

an image information data creating unit configured to create image information data that specifies image data in a case where the inputted information is the image data; and a dummy image data creating unit configured to create dummy image data from the image information data, wherein, in the case where the inputted information is the image data, the log file creating unit is configured to create a log file that includes predetermined log information having the image information data, and in a case where an operation corresponding to the predetermined log information is to be reproduced, the reproducing unit is configured to reproduce the operation corresponding to the predetermined log information by using the dummy image data created from the image information data.

* * * * *